Oct. 14, 1952 A. GOUGE 2,613,402
WINDOW FOR PRESSURIZED CHAMBERS
Filed Oct. 11, 1950

Patented Oct. 14, 1952

2,613,402

UNITED STATES PATENT OFFICE 2,613,402

WINDOW FOR PRESSURIZED CHAMBERS

Arthur Gouge, Ryde, Isle-of-Wight, England, assignor to Saunders-Roe Limited, Osborne, East Cowes, Isle-of-Wight, England Application October 11, 1950, Serial No. 189,541
In Great Britain October 13, 1949

4 Claims. (Cl. 20—40)

It has hitherto been the practice to use relatively flat panels of transparent material, shaped to the form of the body of the cabin, as the portlights or windows in pressurised chambers such as aircraft cabins. These portlights are often made of plastic material, for example the material sold under the British registered trade-mark "Perspex" and as they have to withstand a large pressure difference at high altitudes, the panel constituting each portlight must be thick. Such panels are supported at their edges by the wall of the cabin and are liable to fatigue as the result of repeated flexure under the differential pressure acting on them under different flying conditions. They are, moreover, subject at altitude to a large temperature gradient and, being thick and of poor thermal conductivity, may shear under this temperature gradient.

Failure of a portlight at altitude, by shearing or as the result of fatigue, may have serious effects on the occupants of the cabin. This invention has for its object to provide a portlight which will safeguard against the possibility of failure.

According to the invention a grid, the members of which conform with the curvature of the cabin walls, is used to take the structural loads across the porthole and serves also as an external support for a panel of transparent material.

A pressurised aircraft cabin is usually of circular section and the loads on the shell of the aircraft due to end pressure are longitudinal while those due to radial pressure are circumferential. These loads are taken, according to the invention, by a grid suitably attached to the porthole instead of around a reinforced window frame, as is usually the case. The grid will not hold pressure, but can be seen through, and to hold the pressure a sheet of Perspex or other transparent material shaped to the contour of the cabin is therefore placed inside the grid with a suitable seal around its edge, the sealing material being attached either to the transparent sheet or to the wall of the cabin around the periphery of the porthole. When the cabin is under pressure, the sheet of transparent material is pressed outwardly against the grid and against the edge of the porthole, making it airtight. The grid serves, as stated above, to take the structural loads.

Figure 1:
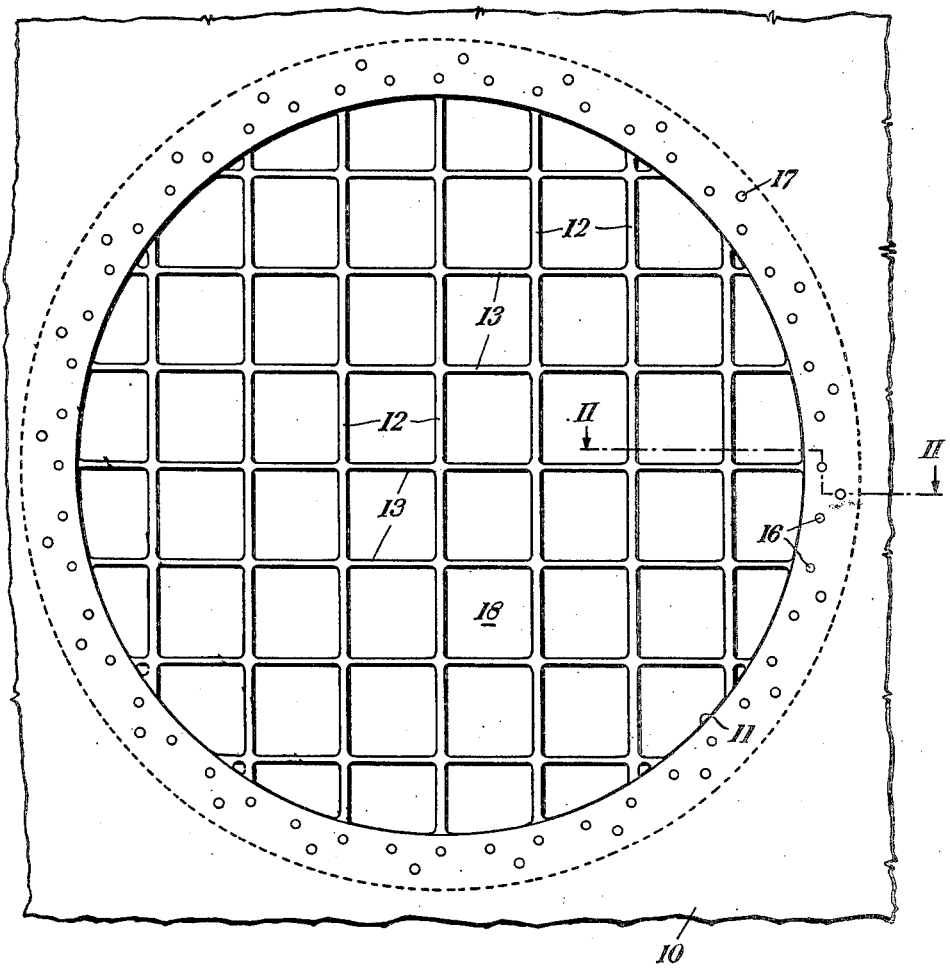
Figure 2:
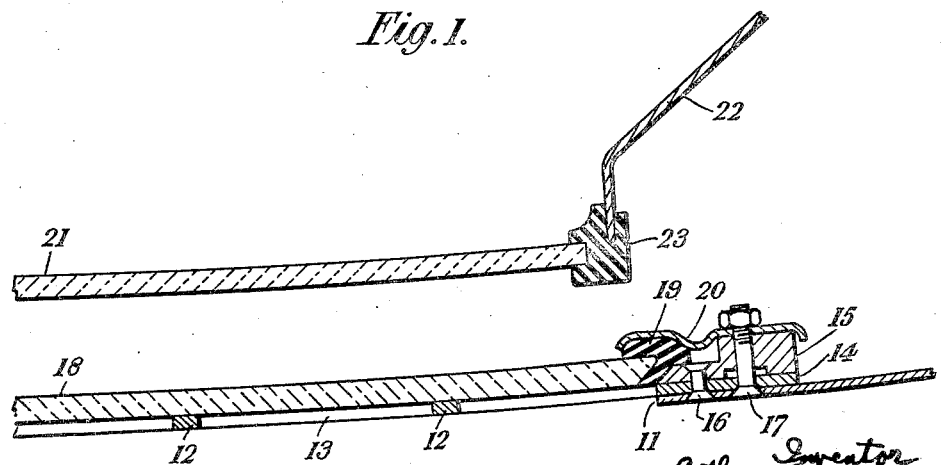

One form of portlight according to the invention will now be described in detail, by way of example, with reference to the accompanying drawing, in which:

Fig. 1 is an elevation of the portlight, seen from the exterior of the cabin, and Fig. 2 is a section, on a larger scale, taken on the line II—II in Fig. 1.

The skin 10 of the pressurised cabin is formed with a circular porthole 11. Within the porthole is fixed a grid, shaped to the contour of the cabin wall, and comprising "vertical" members 12, "horizontal" members 13 and a peripheral flange 14. Around the porthole is a ring 15, forming part of the cabin structure, and the flange 14 of the grid and the portion of the skin 10 adjoining the porthole is fixed to the ring 15 by rivets 16 and bolts 17. The grid serves to take the structural loads across the porthole, its vertical members 12 taking the circumferential loads due to radial pressure in the cabin and its horizontal members 13 taking the longitudinal loads due to end pressure in the cabin.

Inside the grid is a panel 18 of Perspex or other transparent material shaped to the contour of the cabin wall and held by the pressure in the cabin against the inner face of the grid. Around the periphery of the panel 18 is a sealing ring 19 of rubber or the like, which forms, at altitude, a seal around the periphery of the panel 18 and is located by a metal ring 20 attached to the ring 15 by the bolts 17. As the panel 18 is supported by the grid it may be thin, as shown.

Inside the portlight is another panel 21 of transparent material supported from a member 22 of the cabin wall by a ring 23 of rubber or the like. By circulating warm air between the panels 18, 21, the outer panel may be kept warm, thus reducing the tendency of mist to form on the portlight.

In an alternative arrangement, the outer rim of the panel 18 may rest against the flange 14 of the grid, the sealing ring 19 having a portion disposed between the ring 20 and the flange 14 and another portion disposed between the ring 20 and the inner face of the panel 18.

What I claim as my invention and desire to secure by Letters Patent is:

1. In a pressurised aircraft cabin having an outer skin with a porthole therein, the combination of a grid comprising vertical members extending across the porthole, shaped to the contour of the skin and fixed to the skin at the periphery of the porthole, said vertical members serving to transmit across the porthole circumferential loads on the skin, and horizontal members extending across the porthole, shaped to the contour of the skin and fixed to the skin at the periphery of the porthole, said horizontal members serving to transmit across the porthole longitudinal loads on the skin, an imperforate transparent window panel bearing against the inner face of said grid, and sealing means extending around the periphery of the panel, said grid supporting said panel when pressed outwardly by the pressure within said cabin and said sealing means preventing air from escaping from said cabin around the periphery of the said panel.

2. In a pressurised aircraft cabin having an outer skin with a porthole therein, the combination of a grid mounted in said porthole and comprising intersecting members attached at their opposite ends to said skin, said grid conforming with the contour of said skin and serving to transmit across the porthole the stresses in said skin arising from the pressure difference at altitude between the interior and the exterior of the cabin, an imperforate panel of transparent material of thickness insufficient to enable it, if unsupported, to withstand said pressure difference, said panel being held in close contact with the inner face of said grid by said pressure difference, and sealing means around the periphery of said panel for preventing the escape of air from the cabin through the porthole.

3. In a pressurised aircraft cabin, a combination as claimed in claim 2 wherein said porthole and said panel are circular, and said sealing means comprises a sealing ring fitted between the periphery of the panel and the circumference of the porthole.

4. In a pressurised aircraft cabin, a combination as claimed in claim 2, comprising an inner panel of transparent material spaced inwardly from said panel and unattached thereto.

ARTHUR GOUGE.

REFERENCES CITED

The following references are of record in the file of this patent:

UNITED STATES PATENTS

| Number | Name | Date |
| --- | --- | --- |
| 1,012,015 | Riddell et al. | Dec. 19, 1911 |
| 2,025,161 | Franklin | Dec. 24, 1935 |
| 2,203,174 | Muttray et al. | June 4, 1940 |
| 2,269,488 | Schwartz | Jan. 13, 1942 |
| 2,367,035 | McConnell et al. | Jan. 9, 1945 |
| 2,379,194 | Shonts et al. | June 26, 1945 |
| 2,409,808 | Sowle | Oct. 22, 1946 |
| 2,414,705 | Ames | Jan. 21, 1947 |